(12) United States Patent
Bartkowski

(10) Patent No.: US 7,751,832 B2
(45) Date of Patent: Jul. 6, 2010

(54) WIRELESS LOCATION DEVICES AND PROCESS OF MANUFACTURE

(76) Inventor: Brad J. Bartkowski, 307 Clairemont Rd., Villanova, PA (US) 19085

( * ) Notice: Subject to any disclaimer, the term of this patent is extended or adjusted under 35 U.S.C. 154(b) by 80 days.

(21) Appl. No.: 11/708,224

(22) Filed: Feb. 20, 2007

(65) Prior Publication Data

US 2008/0076448 A1    Mar. 27, 2008

Related U.S. Application Data

(60) Provisional application No. 60/775,289, filed on Feb. 21, 2006.

(51) Int. Cl.
    *H04W 24/00*    (2009.01)
(52) U.S. Cl. .............. 455/456.1; 455/456.6; 455/414.2; 340/539.13; 340/539.11; 340/825.36; 342/357.06; 701/213
(58) Field of Classification Search .............. None
    See application file for complete search history.

(56) References Cited

U.S. PATENT DOCUMENTS

| | | | | |
|---|---|---|---|---|
| 6,788,200 B1 * | 9/2004 | Jamel et al. | ............ | 340/539.13 |
| 6,819,258 B1 * | 11/2004 | Brown | .................... | 340/825.49 |
| 6,867,697 B2 * | 3/2005 | Nanayakkara et al. | ... | 340/573.1 |
| 7,098,792 B1 * | 8/2006 | Ahlf et al. | ................ | 340/568.1 |
| 7,251,458 B2 * | 7/2007 | O'Connell | .................. | 455/90.1 |
| 2006/0103538 A1 * | 5/2006 | Daniel | ......................... | 340/574 |
| 2006/0202840 A1 * | 9/2006 | Korbonski | ............... | 340/573.4 |
| 2006/0286972 A1 * | 12/2006 | Kates | ......................... | 455/415 |

* cited by examiner

*Primary Examiner*—Ajit Patel
(74) *Attorney, Agent, or Firm*—John F. A. Earley, III; Frank J. Bonini, Jr.; Harding, Earley, Follmer & Frailey

(57) ABSTRACT

Wireless location device and process of manufacture including a location device for use in an encasement or a shoe, the shoe including a footbed having a first surface, a second surface, and a periphery extending from and connecting the first surface to the second surface, one or more circuit boards, with at least one of the one or more circuit boards being a cellular telecommunications board located within the footbed and connected to the battery, and a cellular antenna located within the footbed and connected to the telecommunications board, all configured to communicate with a cellular network enabling the location device to be located via a cellular network or device based location technology and communicate that location via cellular communication.

58 Claims, 4 Drawing Sheets

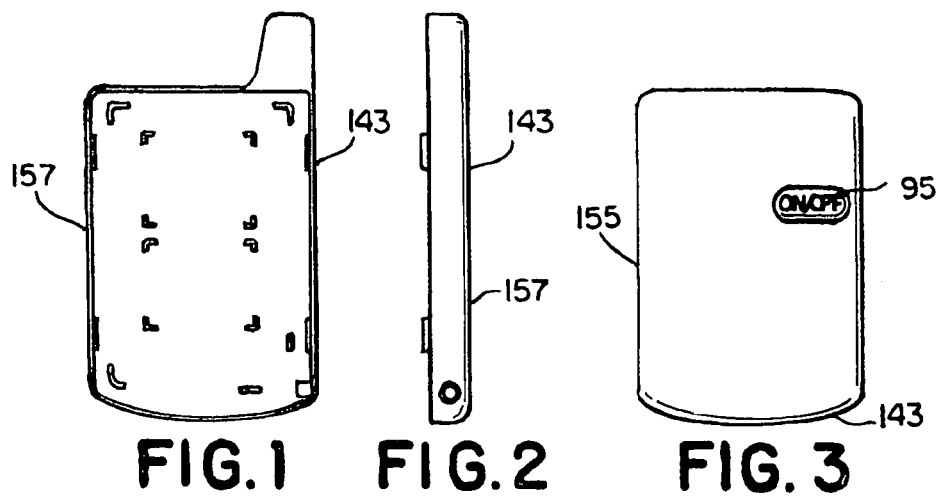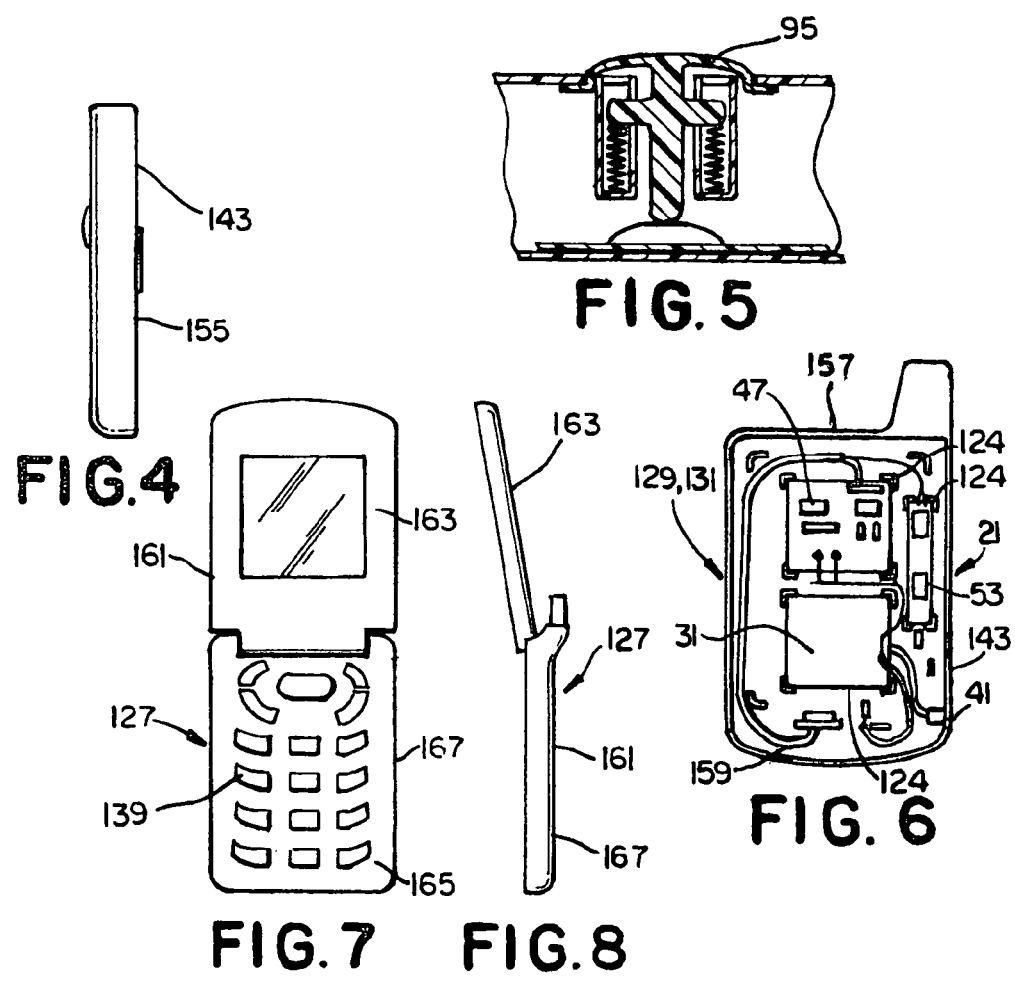

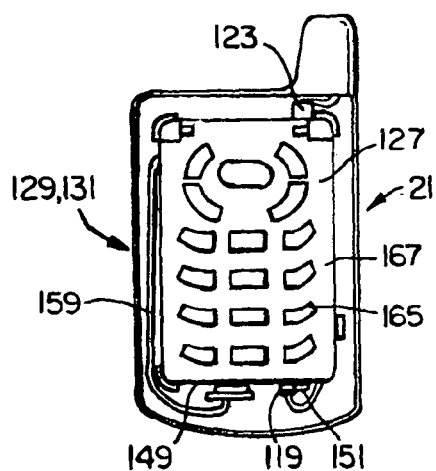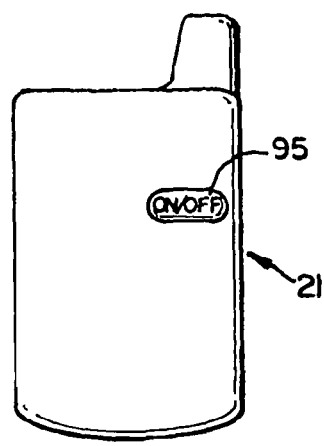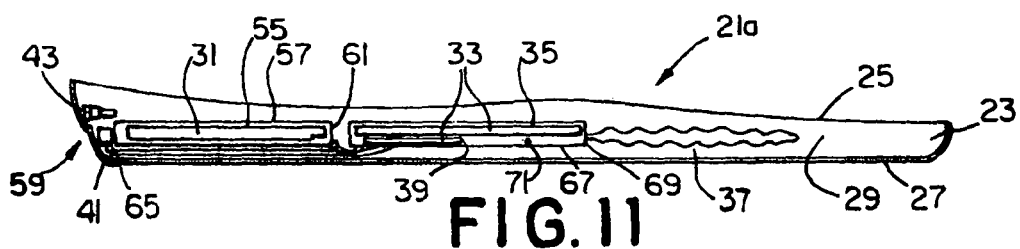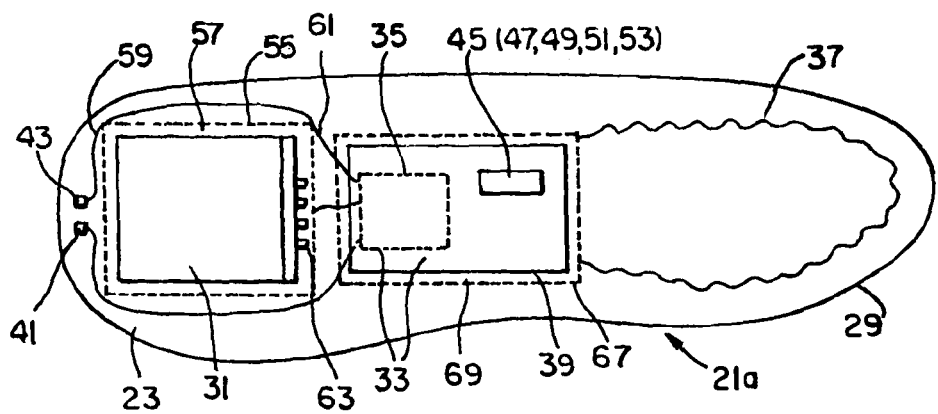

WIRELESS LOCATION DEVICES AND PROCESS OF MANUFACTURE

CROSS-REFERENCE TO RELATED APPLICATION

This patent application claims priority of U.S. Provisional Patent Application Ser. No. 60/775,289, filed on Feb. 21, 2006, which is incorporated herein by reference.

BACKGROUND OF THE INVENTION

1. Field of the Invention

The present invention relates to wireless location devices, and more particularly concerns devices made using parts of cellular telephones and methods of manufacturing location devices using parts of cellular telephones.

2. Background of the Invention

There are two main types of location technology. First, there is device based location technology. Device based location technology utilizes a GPS location circuit which can acquire its location independent of the cellular network. Once it has its location, it communicates its location via the cellular network. The cellular network is only used for communicating the location information. This is the most commonly used location technology. Most devices of this type locate themselves on a predetermined schedule. That is, every 1-2 minutes, the device locates itself and communicates the location to the server. This technology is very open, as you can easily acquire the necessary data plans for the device to communicate to the server. In this scenario, the cellular carrier bills for the amount of the data that the device communicates.

The second type of location technology is network based location technology. In this situation, the cellular network pings the location device in order to determine its location. Through a combination of cellular towers and satellites, the network determines the location of the device. In order to initiate a location request, the cellular network must be pinged by the computer server, the device typically can not remember to locate itself. This technology is very new, and is currently only available through CDMA service providers (Sprint and Verizon). This technology is currently very restricted, as you must have cellular carrier approval to locate the device. In this scenario, the cellular carrier bills for each time the device is located.

In terms of performance, the main advantage of network based location technology is that it can be located indoors as it does not depend solely on GPS satellite signal. It is also superior in that the location devices can be smaller, and utilize less battery power. However, device based tracking is more cost effective for a high number of locates, and is often used in cases of active tracking. Also, some forms of network location do not return speed information, while device based location technology always relays speed.

Today, the types of location devices which offer the technology discussed above are very costly. A wireless location device typically costs in excess of $300. In business to business and government applications, the market is capable of accepting such prices. However, in the consumer market, this pricing is not feasible. It is not cost effective for consumers to utilize location services because of the high cost of location devices.

Location devices are expensive for several reasons. First, the devices must be developed as a corporative effort with the company that has designed the communications network. Often, this typically involves the creation of chipsets that are unique to the device. Secondarily, location devices are costly because once constructed, they require extensive network testing to ensure that they do not disrupt network traffic. The testing requires a large time and capital commitment on the part of the operator of the communications network. The final reason why these devices are costly is that they are constructed of mostly new materials each time. That is, devices are rarely recycled.

However, wireless location devices are very similar to cellular telephones. The communication technology of a cellular telephone is nearly identical to that of a location device. Secondarily, due to a federal emergency 911 mandate, cellular telephones are now equipped with limited location technology. Also, Americans throw away or store a large number of previously used cellular telephones each year. Many of these pre-used phones are no longer capable of operating as a cellular telephone due to feature damages. However, the communication components of the phones are still fully functional.

SUMMARY OF THE INVENTION

It is an object of this invention to allow for the cost effective production of wireless location devices. This object and other objects are accomplished by providing the devices and utilizing the inventive methods described below.

I have developed a manufacturing process for the creation of low cost location devices. This manufacturing process involves utilizing the existing communication and location components of new or pre-used cellular telephones. These components are removed form the cellular telephone, subjected to limited modifications, and repackaged within the new location device. In addition, the inventive location device may include one of the following:

(a) a global positioning receiver for the purpose of acquiring location information, (b) a centralized battery system for the purpose of increasing the battery life and standardizing charging components, (c) limited electrical and mechanical modifications for the purposes of controlling the device, and (d) the addition of mass storage devices to provide the location device with memory capability.

The advantages of the manufacturing process described above include the following:

(a) the ability to create a low cost location device, (b) the ability to limit network testing and decrease the time between conception and deployment of a new location device, (c) the ability to limit the dependence upon new materials by utilizing existing hardware, and (d) the ability to utilize a standardized hardware core across multiple styles of device.

My invention also limits the amount of network testing because the new device utilizes pre-approved components. Reduced testing not only reduces costs, but also reduces development time. The invention limits the dependence upon new materials for the creation of new location devices, and also allows standardized hardware to be used across multiple styles of device. This means that the same components that are used in an inventive shoe-like device for a person in accordance with one embodiment of the invention may also be built into an inventive collar-like device for a pet in accordance with another embodiment of the invention.

BRIEF DESCRIPTION OF THE DRAWING

FIG. 1 is a top plan view of a lower half of a plastic exterior casing of a first embodiment of the invention shown in FIG. 1.

FIG. 2 is a side view of the lower half of the plastic exterior casing shown in FIG. 1.

FIG. 3 is a top plan view of an upper half of a plastic exterior casing of a first embodiment of the invention.

FIG. 4 is a side view of the upper half of the plastic exterior casing shown in FIG. 3.

FIG. 5 is a sectional view of the exterior power button.

FIG. 6 is a top plan view of the lower half of the plastic exterior casing with the optional GPS receiver, memory, and centralized battery system installed.

FIG. 7 is a top plan view of an ordinary flip top cellular telephone in an opened position.

FIG. 8 is a side view of an ordinary flip top cellular telephone shown in FIG. 7.

FIG. 9 is a top plan view of the lower half of the invention which uses the components of the lower half of the telephone of FIGS. 7 and 8, the view showing the lower half of the plastic exterior casing of the invention with the cellular phone components installed therein. The optional GPS receiver, memory, and centralized battery system reside below the cellular phone components.

FIG. 10 is a top plan view of the finished construction of the first embodiment of invention showing the upper exterior casing thereof.

FIG. 11 is a side cross-sectional view of an alternative embodiment of the invention showing a location device for use in footwear and various components of the device.

FIG. 12 is a top plan view of the location device of FIG. 11 showing various components thereof.

DETAILED DESCRIPTION OF THE PREFERRED EMBODIMENTS

Figure 13:
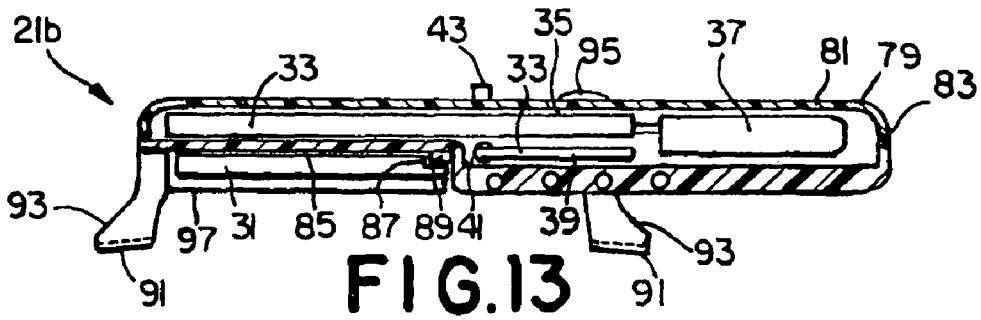
FIG. 13 shows a view in cross section of a pet location device in accordance with a third embodiment of the invention.

Referring to FIG. 11 and FIG. 12, there is shown a location device 21a for use in footwear comprising a footbed 23 for housing various component parts of location device 21a. The footbed 23 has a first surface 25, a second surface 27, and a periphery 29 extended from and connecting the first surface 25 to the second surface 27. A battery 31 is provided for providing power to one or more circuit boards 33 located within the footbed 23, with at least one of the one or more circuit boards 33 being a cellular communications board 35. The location device 21a also has a cellular antenna 37. The battery 31 is connected to the cellular telecommunications board 35, the cellular communications board 35 is connected to the cellular antenna 37, and the cellular telecommunications board 35 is configured to communicate with a cellular network, thereby enabling the location device 21a to be located via a cellular network. The location device 21 may further comprise a charging port 41 that is connected to the battery 31 and/or the one or more circuit boards 33, and the device location 21a may have an LED indicator 43 for reporting the operation of the location device 21a and the battery 31. The location device 21a also may have at least one of the following optional component 45: a GPS chip 47 a Bluetooth chip 49, a WiFi chip 51, and extra memory 53. The location device may further comprise battery compartment 55, wherein the battery 31 may be removably placed in the battery compartment 55. The battery compartment preferably has a rigid shell 57 for containing the battery 31, the shell 57 having an open end 59 and a closed end 61. Metal contacts 63 are disposed within the shell 57 for electrically coupling with the battery 31. The shell 57 preferably is constructed to receive a standard cell phone battery 31. The shell may have a removably locking battery compartment door 65 for keeping battery 331 in place during operation and allowing for removal and replacement of battery 31 when desired. The removably locking battery compartment door 65 preferably is disposed to enclose the open end 59 of the shell 57 terminating at the periphery 29 of the footbed 23. The location device 21a may further comprise a board compartment 67 for containing the one or more circuit boards 33 and/or at least one of the optional components 45. The board compartment 67 preferably has a rigid casing 69. A hot glue type substance 71 preferably is used for locking the components (39, 45, 47, 49, 51, 53) in place and sealing and strengthening the board compartment 67.

Alternatively, the battery 31 may be configured to reside outside of the footbed 23, elsewhere on the shoe or connected to the laces or elsewhere on the person, and being connected to the device 21a with a wire.

In accordance with this embodiment of the invention, the location device 21a may be constructed in the footbed 23 of a shoe. The footbed 23 preferably is constructed in a self contained manner such that it may be removed from one shoe and placed in another shoe, allowing the location device 21a to operate across a variety of seasons and events. To construct this unit, first either a hollow empty shell of a footbed 23 or a solid footbed 23 is provided. If a solid footbed 23 is used, the compartments 55, 67 are bored out of the solid footbed 23.

Referring to the removable locking battery compartment door 65 the door 65 may be locked, keeping the battery inside during normal operation, and it may be unlocked and opened to remove the battery 31 for replacement. At the closed end 61 of the battery compartment 55 wires 73 are provided which run from the metal contact 63 to the board compartment 67. The power monitoring and management board 39 connects to various electrical systems within the location device 21a, allows the location device 21a to charge, monitors the battery 31, and ensures that the location device 21a is performing properly. As discussed above, in addition to the cellular telecommunications board 35, the location device 21a may also contain a variety of other optional components 45, such as a GPS chip 47, bluetooth chip 49, WiFi chip 51, and/or extra memory 53.

The boards 33 within the board compartment 67 are wired together to allow the location device 21a to function properly. Also, the boards 33 are wired to the charging port 41, LED indicator 43, and cellular antenna 37, which are located in various parts of the footbed 23. The rigid casing 69 of the board compartment 67 may be filled with a hot glue type substance which seals, strengthens and locks the components in place.

The rigid casing 69 with the components sealed inside, is next installed to the footbed 23. If the footbed 23 is initially a hollow casing, the footbed 23 is next filled with a liquid setting gel that surrounds and locks the components in place.

If the footbed 23 is initially a solid piece of material that has been bored out, then a top sealing layer is placed to seal the unit in place.

In use, the location device 21a may be incorporated into a shoe for use in locating the individual wearing the shoe. The location device 21a transmits a signal which enables the location of the device 21a to be located via a cellular network or via both cellular network technology and GPS technology (if GPS technology is incorporated into the location device 21a). The device 21a may be recharged periodically to maintain power supply for the device. In an alternate embodiment, one or more of the components (the cellular antenna, for example) may reside outside of the sleeve 37 or be attached to the shoe via the shoe laces.

Figure 14:
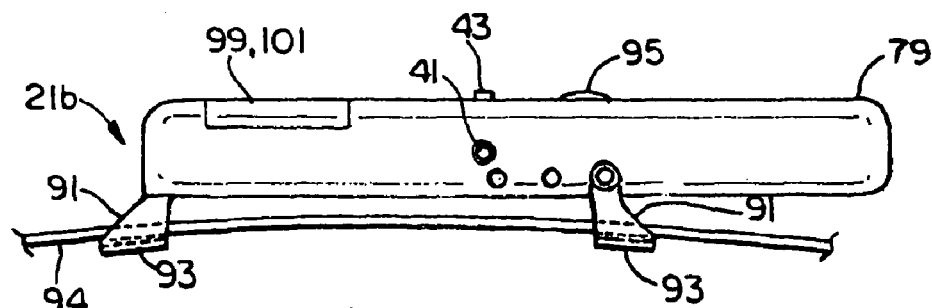
FIG. 14 is a side view of the pet location device of FIG. 13.
Figure 15:
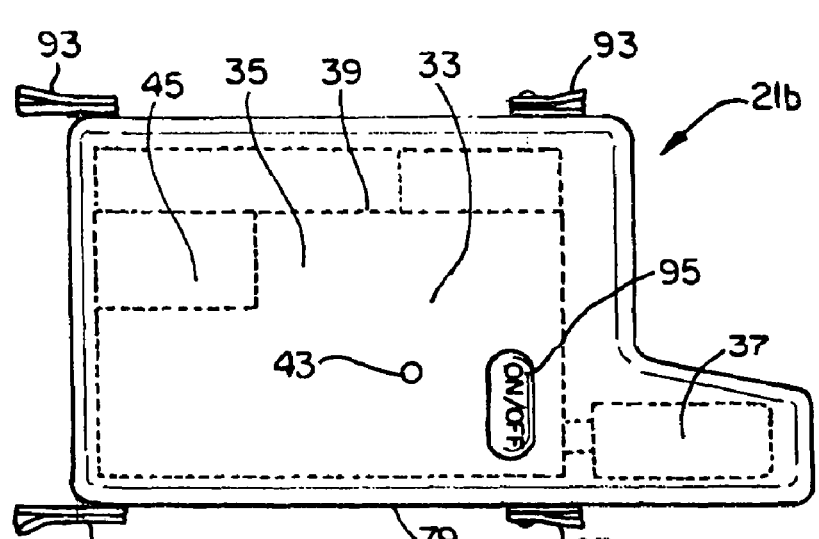
FIG. 15 is a top plan view of the pet location device of FIGS. 13 and 14.
Figure 16:
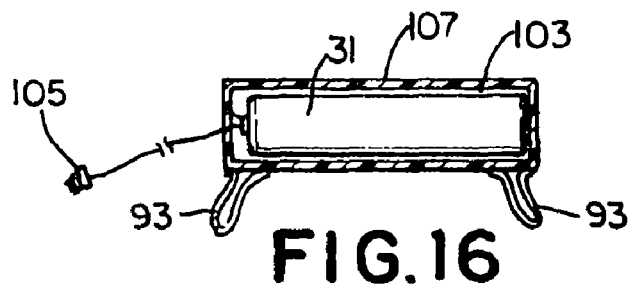
FIG. 16 is a view in cross section of the auxiliary battery.

Turning now to FIGS. 13, 14, and 15, there is shown a pet location device 21b. The location device 21b has an encasement 79. The encasement 79 has an interior portion 81 and an exterior portion 83. The device 21b is provided with a battery mount 85 for coupling with a battery 31 having battery terminals 87. The encasement 79 preferably is provided with one or more mounts 91, the mounts 91 being preferably loops 93 mounted to, or integral with, the exterior portion 83, for facilitating attachment of the location device 21b to a pet's (for example, a dog or a cat) collar 94. Preferably, at least one of the loops 93 is laterally adjustable relative to one of the other loops 93 such that the location device 21b may be adjusted to fit the size of the collar of the pet. A battery 31 may be mounted on the battery mount 85 to provide power to the pet location device 21b. One or more circuit boards 33, located within the encasement 79, with at least one or more circuit boards 33 being a cellular telecommunications board 35, is/are provided. A cellular antenna 37 is preferably mounted in or to the encasement 79. The battery 31 is connected to the cellular telecommunications board 35, the cellular telecommunications board 35 is connected with the cellular antenna 37, and a cellular telecommunications board 35 is configured to communicate with a cellular network, thereby enabling the location of the device 21b to be located via cellular network technology.

Preferably, the location device 21b has a power monitoring management board 39 as one of the one or more circuit boards 33. The power monitoring and management board 39 preferably is located within the encasement 79, and is connected to the battery 31 and a cellular telecommunications board 35 for monitoring the battery 31 and the performance of the one or more circuit boards 33. The location device 21b may further comprise a charging port 41 extending between the exterior portion 83 of the encasement 79 and the interior portion 81 of the encasement 79 and connected to the battery 31 and the one or more circuit boards 33. The location device 21b may further comprise a power button 95 extending between the exterior portion 83 of the encasement 79 and the interior portion 81 of the encasement 79. The power button may be connected to the power monitoring and management board 39 for powering the location device 21b. The location device 21b may further comprise a status LED 43 extending between the exterior portion 83 of the encasement 79 and the interior portion 81 of the encasement 79 for indicating the status of the operation of the location device 21b and/or the battery 31 by flashing or blinking. The location device 21b may contain optional components 45. For example, the optional components 45 may be a GPS chip 47, a bluetooth chip 49, a WiFi chip 51, extra memory 53, or any combination thereof. Preferably, the battery mount 85 may be removably coupled to the encasement 79. Further, a battery cover 97 preferably is provided that attaches to the encasement 79 and covers that battery mount 85 and the battery 31 mounted on the battery mount 85. Optionally, the location device 21b may further comprise a flashable light 99 extending between the exterior portion 83 of the encasement 79 and the interior portion 81 of the encasement 79 for providing a lost signal. The flashable beacon 99 is connected to the one or more circuit boards 33 for allowing selectable operation. Optionally, the location device 21b may further include a speaker 101 for providing a lost signal, the speaker being connected to the one or more circuit boards 33 for selectively providing a loss audible signal. The location device 21b may also include an external auxiliary power supply 103 connected via the charging port 41 with a plug 105. The external auxiliary power supply 103 has one or more loops 93 for facilitating attachment to the collar. Ideally, the auxiliary power supply 103 comprises a battery 31 with a sealed encasement 107.

In use, the location device 21b may be attached to a pet's collar using mounts 91. The location device 21b transmits a signal which enables the location of the device to be located via a cellular network or via both cellular network technology and GPS technology (if GPS technology is incorporated into the location device 21b). The device may be recharged periodically to maintain power supply for the device.

The pet location device 21b may be generalized to be used with other applications not involving collars or pets. The generic location device 21c is similar to the pet location device 21b except the generic location device 21c may not contain loops for attaching to the pet collar and the battery arrangement may be different.

Figure 17:
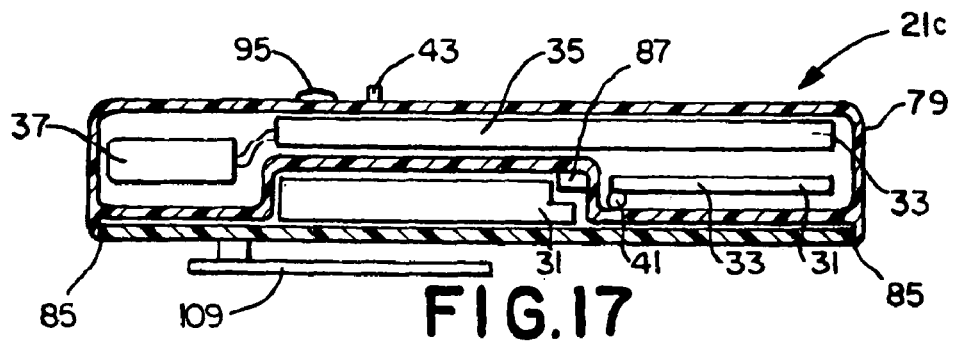
FIG. 17 is a view in cross section of a generic location device constructed in accordance with the invention.
Figure 18:
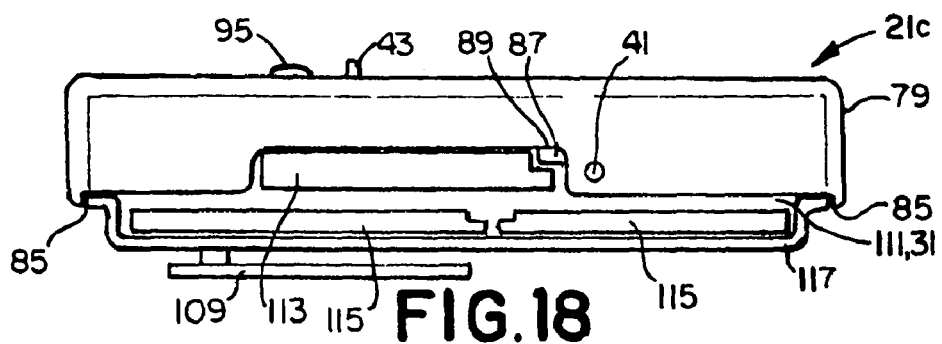
FIG. 18 is a side view in partial section of the generic device of FIG. 17 showing the extended life battery.

Referring now to FIGS. 17 and 18, there is shown a generic location device 21c. In place of loops 93, the generic location device 21c may include a clip 109 or other fastening device for securing the location device 21c to a subject, such as a car or a person, that is desired to be locatable via cellular network technology. In an alternative embodiment shown in FIG. 18, the location device 21c has an extended battery 111, the extended battery 111 being a battery 31 having a primary cell 113 and one or more extended cells 115, the cells 113, 115 being connected together and to one or more battery terminals 87. The cells may be enveloped in a second encasement 117 with the battery terminals 87 extending through the second encasement 117 and configured to electrically connect with the metal tabs 89 of the encasement 79. Preferably, the second encasement 117 mounts with the battery mount 85 of the encasement 89 and is secured thereto by securing means.

In use, using a clip 199 the location device 21c may be attached to an object, such as a car or person, for tracking the object. The location device 21c transmits a signal which enables the location of the device 21c to be located via a cellular network or via both cellular network technology and GPS technology (if GPS technology is incorporated into the location device 21c). The location device 21c may be recharged periodically to maintain power supply for the device.

Figure 19:
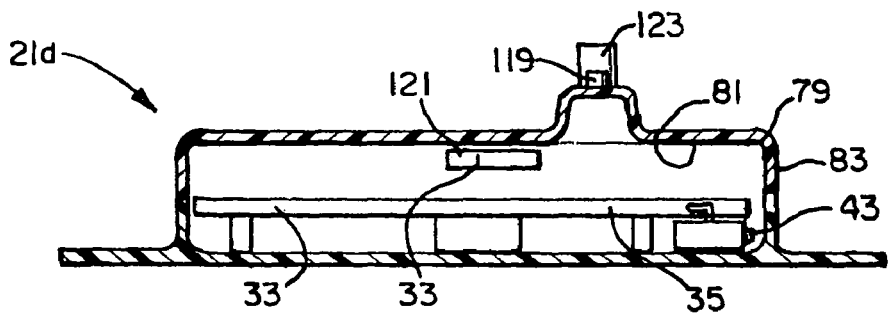
FIG. 19 is a view in cross section of a vehicle location device constructed in accordance with another embodiment of the invention.
Figure 20:
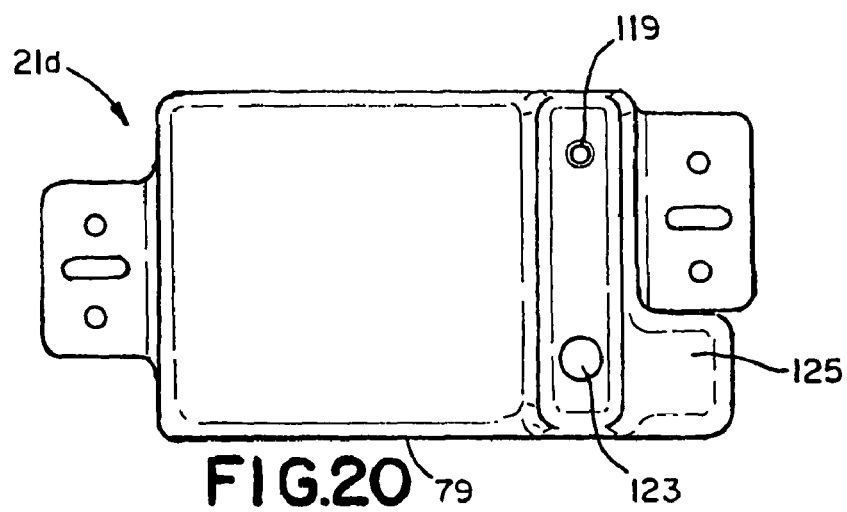
FIG. 20 is a top view of the vehicle location device of FIG. 19.

Referring to FIGS. 19 and 20, there is shown vehicle location device 21d comprising an encasement 79, the encasement 79 having an interior portion 81 and an exterior portion 83, and a encasement wall that defines the encasement 79. A power port 119 extends through the exterior wall for receiving external power from a vehicle power source. A power conversion circuit 121 is located inside the encasement 79 for converting the external power for use by the vehicle location device 21d. One or more antenna ports 123 extend through the encasement wall for connecting with one or more antennas 125. The vehicle location device 21d further comprises one or more circuit boards 33 located within the encasement 79, with at least one of the one or more circuit boards 33 being a cellular telecommunications board 35. External power may be provided to the power port 119, which is connected to the power conversion circuit 121 and to the cellular telecommunications board 35. The cellular telecommunications board 35 is connected with the one or more antenna ports 123, and the cellular telecommunications board 35 is configured to communicate with a cellular network, thereby enabling the device 21d to be located via cellular network technology. The vehicle location device 21d may further have a power monitoring and management board 39 as one of its circuit boards 33. The power monitoring and management board 39 is located within the encasement 79 and connected with the power conversion circuit 121 and the cellular telecommunications board 35 for powering the location device 21 and monitoring the performance of the one or more circuit boards 33. The vehicle location device 21d may further include a status LED 43 extending through the encasement wall for indicating the status of the operation of the location device 21d. The location device 21d also may include one or more of the following optional components 45: a GPS chip 47, a bluetooth chip 45, a WiFi chip 51 and/or extra memory 53. More than one optional component 45 may be used depending on the type of functionality required for the location device 21d. The device 21d may further include components capable of connecting with a vehicle diagnostics board in order to relay real time vehicle information via the cellular networks.

In use, the location device 21d may be placed in a vehicle for tracking the location of the vehicle. The location device 21d, powered by the external power being applied thereto, transmits a signal which enables the location of the device 21d to be located via a cellular network or via both cellular network technology and GPS technology (if GPS technology is incorporated into the location device 21d).

Referring generally to FIGS. 1-10 and FIGS. 11-20, each location device 21, 21b, 21c, and 21d may be manufactured using components 129 from new or pre-used cellular phones 127. This manufacturing process comprises providing one or more cellular phones 127, removing a cellular phone component 129 from the one or more cellular phones 127, modifying the cellular phone component 129, and packaging the cellular phone component 129 such that the cellular phone component 129 operates to communicate with the cellular network. The method may further comprise providing an additional component 131 and incorporating the additional component 131 with the cellular phone component 129. The modifying step may comprise mechanical modifications and/or electrical modifications to the cellular phone component 129, and the packing step may comprise inserting the cellular phone component 129 into a case. The one or more cellular phones 127 may be new or preused, used, damaged, bought in surplus, obsolete, bought in parts, or in parts. The cellular phone 129 component may be a communication component such as a telecommunications board 35, a location component such as a GPS chip 47, a power component 137 such as a battery 31 or a power management board 39, or a control component 139 such as a keypad or power button 95, of the one or more cellular components 129. The additional components 131 used in the method may include communication components 133, location components 135, control components 139, power components 137 taken from the cellular phones, global positioning receivers 47, batteries 31/131, standardized charging components 145, memory components 53 for providing storage capability, and/or modified controls 147 preferably taken from the cellular phones. The components 129 and 131 may also include centralized batteries 31, external power sockets 41, and power plugs 51. The power component 137 may include a power port 119 from a cellular phone 127.

Preferably, the communication components 133 include data ports 149, preferably taken from the cellular phones 127.

Alternatively, the inventive method may be modified from the method set out above by providing the cellular telephone components by acquiring them from a source such as a manufacturer or a dealer, such as a dealer in overstocked goods, before the cellular telephone components have been assembled into cellular phones, rather than acquiring them by removing the cellular telephone components from new or pre-used cellular phones.

Preferably each location device is constructed into the casing 143 or encasement 79 such that the user is prevented from directly using the keypad 165 (if installed) by depressing the individual buttons. This may prevent the user from accessing the cellular phone 127 or directly accessing the voice capability of the cellular phone without breaching or destroying the encasement 79 or casing 143.

The method of making or manufacturing the location device 21 may further comprise wiring the centralized battery 31 to the external power socket 41 and the power plug 151, and connecting the power plug 151 to the power port 119. The method may further comprise wiring a GPS receiver 47 and memory 53 directly to the centralized battery 31. The method may further comprise wiring the GPS receiver 47 and memory 53 to the cellular telephone component 129 from the one or more cellular phones 127. The method may further comprise providing a data plug 153 for coupling with the data port 149 of the one or more cellular phones 127 and connecting the GPS receiver 47 and memory 53 to the cellular phone component 129.

An alternative method of creating the location device 21, 21b, 21c, and 21d utilizing components 129 from new or pre-used cellular phones 127 comprises providing a cellular phone 127, installing cellular phone location software onto cellular phone 127, disassembling the cellular phone 127 to obtain the cellular phone components 129 needed to transmit a signal capable of being received by a cellular network, providing a plastic outer casing 143, the plastic outer casing 143 having an upper half 155 and a lower half 157, and mounting the cellular phone components 129 and any optional components 45 into the lower half 157 of the plastic outer casing 143. Then a power member is provided. The power member preferably is a battery 31 or a power conversion circuit 121. If a battery 31 is used, a power cord 159 is provided. The power cord 159 is capable of connecting with a charging port 119 of the one or more cellular phones 127. The power cord 159 from the centralized battery 31 then is connected with the cellular phone components 129 through the charging port 119, and the exterior antenna 125 may be wired to the antenna port 123 or the cellular phone component 129. The upper half 155 of the casing 143 and the lower half 157 of the casing 143 is then sealed. These steps may be combined with one or more of the steps mentioned above.

In an alternative embodiment, the one or more cellular phones 127 is a flip top cellular phone 161, the flip top cellular phone 161 having a flip top 163, a battery 31, a key pad 165, and a main body 167. The method involves the removing the flip top 163, the battery 31 and the antenna 125 from the flip top cellular phone 163. The flip top cellular phone 163 may have a data port 144. If a flip top cellular phone 163 is provided that has a data port 149, the method may further comprise the steps of providing a GPS receiver 47, a centralized battery 31, and memory 53, installing control software for allowing the location device 21 to manage the GPS receiver 47 and the memory 53, and installing and mounting the GPS receiver 47 and the centralized battery 31 and the memory 53 into the casing 143. The method of manufacture may further comprise providing a data cable 169, having a data plug 153 capable of connecting to the data port 149 and connecting the data cable 169 to the GPS receiver 47, the memory 53, and the data port 149. The method may further comprise providing an on/off power button 95, the on/off power button extending through the casing 143 and cooperating with the one or more cellular phones 127 either mechanically or electrically to power the location device 21. After the various components described above are selected and configured, said components are then inserted inside an encasement 79 and the encasement 79 is sealed.

Each location or device may include a circuit to monitor the status of the device (e.g. the battery level or the operation of the device compared against a set of optimal operating parameters) to ensure it is working properly. Each location device may include a switching circuit which is capable of resetting the unit in case it freezes.

Each location device, if equipped with a bluetooth chip, may be configured to communicate information, including location information, to any random cellular telephone in the devices vicinity.

Each location device/tracking device (21, 21*a*, 21*b*, 21*c* and 21*d*) may utilize a cellular carrier's location technology to determine its location. Each tracking device may utilize a cellular carrier's tower sector triangulation to determine its location, or each location device may use any combination of a GPS chip, cellular network based technology, and cellular sector triangulation to determine its location. Each location device may be configured with a circuit, software, or both such that the device automatically turns on when power is applied to the device.

Preferably, each location device may be configured such that the battery 31 can be easily removed or replaced by another battery 31. This would allow for the first battery 31 to be charged while the tracking can still operate. The LED 43 may operate to indicate a low battery 31 condition which informs the user that the battery 31 is low. Each tracking device may include a low battery indicator which sends a low battery message to a third party over a wireless network. Each location device may be configured with a circuit, software, or both such that the device automatically turns on when power is applied to the device.

Each location device, if equipped with a Wi-Fi chip, may be configured to communicate information, including location information, to a Wi-Fi network in its vicinity. Each tracking device may include an external non-power GPS antenna or an external power GPS antenna. Each location device may include an external non-powered cellular antenna, or an external power cellular antenna. The tracking device may be further enclosed in a casing 43 or an encasement 79 that is waterproof and water resistant. This includes the external plug ports and or buttons. Each tracking device may include a rubber polymer design to absorb the shock of impact.

Each location device may include a second layer exterior casing, which when attached clamps the location device to a strap. Each location device may have interchangeable faceplates for the encasement 73 of different colors and styles, or the encasement 73 may comprise a pair of exterior shells, the exterior shells being selectable from a variety of colors and styles. Each location device may have an external antenna constructed into a strap.

Each tracking device may include environment sensors, such as sounds, temperature sensors, humidity sensors, etc. such that the device can monitor and relay this information to a third party over the wireless network. Each tracking device may be configured to relay information continuously from said sensors or relay information when a particular even occurs.

The casing 143 or encasement 79 may include interior ribs to make the casing stronger. The casing 143 or encasement 79 may have an interior 124 which may mimic the interior of the cellular phone casing, allowing it to support the communication components. Each tracking device may include an LED 33 or other flashable light 99 which can be configured to illuminate by a trigger event in the environment or to be triggered by a third party communication to the location device over the cellular network. Each tracking device may include a speaker 101 or other noise indicator that produces a sound, prerecorded message, or live message communicated by the cellular network. This audio indicator may be triggered by an event in the environment or triggered by a third party and communicated over the cellular network.

The tracking device may be constructed to a piece of fabric which encompasses a large area. This fabric can be temporarily or permanently affixed to the inside of a piece of clothing. Each of the location devices may be configured such that the tracking application is automatically launched to enable the location device to be located. Each tracking device may include the panic button that when depressed sends a signal to a third party over the wireless network and or creates an audible and or visual signal from the unit. Each location device may be configured to connect to a power external GPS antenna via capacitor to prevent power from traveling onto the phone's antenna ports. Each tracking device may include a screen that relays written messages to the asset being tracked.

The devices of the invention can be used to provide tracking services, those services work through a mix of several technologies. First, the location device acquires its location. This can be done through a variety of different location technologies discussed earlier concerning GPS and cellular networks. Most of the time location is acquired through the GPS satellite system. The GPS satellites tell the location device its longitude, latitude, speed, and time. This information along with a unique device ID is then relayed to a computer server. My services use cellular data transfer to communicate the location information to our server. This is the same technology that allows you check email or surf the internet on a cellular phone.

Once the location information is stored on the server, there is much you can do with it. In order to access the information, the customer must log on to our internet site with a unique username and password. When logged in, the customer has full access to view the location of any and all of their assets being tracked by a location device 21.

Through a mapping engine on the server, the location can be displayed on a map. The map can be zoomed and panned to display different areas. Through a piece of server software known as a reverse geocoder, you can convert the latitude and longitude into a street address. This helps the user know exactly where the asset is. The user can view the location history of a particular asset. By selecting the asset and inputting a date and time range, the application will return all locations within that time frame. The user can see with every location how fast the asset was traveling at that instantaneous time. The user can do a proximity search. By inputting a desired location and radius, the application will return a list of the assets and their locations within that range. The user can identify a particular place with a name. That is, they can input a street address and save it as a particular location, such as Home, Office, Park, etc. Now, whenever the asset is at that location, it will identify the place by name. The user can place a preset speed limit on an asset. If an asset travels in excess of that speed, the user can be notified via e-mail or text message. The user can place a stop time alert on an asset. If an asset is stopped in excess of a particular period of time, the user can be notified via e-mail or text message. The user can place a particular zone around an area. If the asset travels into or out of that particular area, the user can be notified via e-mail or text message. Reports can be generated which convey the above information. That is, instead of requesting to be notified of future alerts, the user can ask the server to report back speeding, stop time, and zone violations that have happened in the past. The user can change how often a particular location device reports in. The user can change the name which is identified with a particular device.

What is claimed is:

1. A location device for use in a shoe, comprising
   a footbed, the footbed having a first surface, a second surface and a periphery extending from and connecting the first surface to the second surface,
   one or more circuit boards, with at least one of the one or more circuit boards being a cellular telecommunications board, located within the footbed and connected to the battery, and
   a cellular antenna, located within the footbed and connected to the cellular telecommunications board,
   wherein the cellular telecommunications board is configured to communicate with a cellular network, thereby enabling the location device to be located via cellular network location technology, and communicate that location via cellular communication;
   wherein the encasement encloses the one or more circuit boards and prevents the dialing of telephone numbers with the location device; and
   wherein the one or more circuit boards comprise components from at least one cellular telephone.

2. The location device of claim 1, further comprising a battery positioned within the footbed to power the location device.

3. The location device of claim 1, further comprising a battery placed elsewhere on the shoe or person and connected by wire to power the unit.

4. The location device of claim 1, the device being configured as a removable insert constructed in a self contained manner that allows the location device to be taken out of one shoe and placed in another.

5. The location device of claim 1, further comprising a power monitoring and management board that is connected with the battery and the cellular telecommunications board for charging the battery, monitoring the battery, and monitoring the performance of the one or more circuit boards.

6. The location device of claim 5, further comprising a charging port that is connected to the battery and the one or more circuit boards and/or the battery.

7. The location device of claim 1, further including a LED indicator for reporting on the operation of the location device and/or the battery.

8. The location device of claim 1, the device having software incorporated therein for transmitting via the cellular network information regarding operation of the location device and/or the battery.

9. The location device of claim 1, further comprising at least one optional component, wherein the at least one optional component is a GPS chip, a bluetooth chip, a wifi chip, extra memory, or a combination thereof.

10. The location device of claim 1, further comprising a mechanism for automatically turning the device on when power is applied to the device.

11. The location device of claim 1, the battery being removably positioned in a battery compartment positioned in the footbed,
    the battery compartment comprising a shell for containing the battery, the shell having an open end and a closed end,
    metal contacts disposed within the shell for electrically coupling with the battery, and
    a removably locking battery compartment door for keeping the battery in place during operation and allowing for removal and replacement of the battery, the removably locking battery compartment door disposed to enclose the open end of the shell, said open end of the shell terminating at the periphery of the footbed.

12. The location device of claim 1, further comprising a board compartment for containing the one or more circuit boards and/or the at least one optional component, the board compartment comprising a rigid casing and a hot glue type substance for locking the components in place and sealing and strengthening the board compartment.

13. The location device of claim 1, further including a panic button which when depressed sends an emergency signal via the cellular network.

14. A location device, comprising
    an encasement, the encasement being defined by an encasement wall,
    a battery mount for coupling with a battery having battery terminals,
    metal tabs extending through the encasement wall for creating an electrical connection with the battery terminals,
    a battery positioned in the battery mount for providing power, and
    one or more circuit boards, with at least one of the one or more circuit boards being a cellular telecommunications board, located within the encasement and connected to the battery, and
    a cellular antenna connected to the cellular telecommunications board,
    wherein the cellular telecommunications board is configured to communicate with a cellular network, thereby enabling the location device to be located via cellular network location technology, and communicate that location via cellular communication, and
    wherein the encasement encloses the one or more circuit boards and prevents the dialing of telephone numbers with the location device.

15. The location device of claim 14, the circuit boards including a power monitoring and management board located within the encasement and connected with the battery and the cellular telecommunications board for powering the location device, monitoring the battery, and monitoring the performance of the one or more circuit boards.

16. The location device of claim 14, further comprising a charging port extending through the encasement wall and connected to the battery and the one or more circuit boards.

17. The location device of claim 14, the encasement comprising an exterior casing which is water and shock resistant.

18. The location device of claim 14, further including a mechanism for automatically turning the device on when power is applied to the device.

19. The location device of claim 14, further including a power button extending through the encasement wall and connected to the power monitoring and management board for initiating power flow from the battery.

20. The location device of claim 14, further including a status LED extending through the encasement wall for reporting on the operation of the location device and/or the battery.

21. The location device of claim 14, further including a panic button which when depressed sends an emergency signal via the cellular network.

22. The location device of claim 14, further including the construction in a thin flexible exterior casing capable of being sown into a piece of clothing.

23. The location device of claim 14, the device having software incorporated therein for transmitting via the cellular network information regarding operation of the location device and/or the battery.

24. The location device of claim 14, further comprising at least one optional component wherein the at least one optional component is a GPS chip, a Bluetooth chip, a WiFi chip, extra memory, or a combination thereof.

25. The location device of claim 14, further including interchangeable faceplates for the encasement of different colors and styles, or the encasement comprising a pair of exterior shells, the exterior shells being selectable from a variety of colors and styles.

26. The location device of claim 14, the battery being removably coupled with the battery mount, and the encasement having a battery cover that attaches to the encasement to cover the battery mount and the battery.

27. The location device of claim 14, further comprising a flashable light extending through the encasement wall for providing a lost signal, the flashable light being connected to the one or more circuit boards.

28. The location device of claim 14, further comprising a speaker for providing a lost signal, the speaker being connected to the one or more circuit boards.

29. The location device of claim 14, further comprising a series of environmental sensors capable of recording environment status information, and relaying that information via the cellular network.

30. The location device of claim 14, further including a mounting device formed on the exterior portion of the encasement for facilitating attachment of the location device to another object.

31. The location device of claim 30, wherein the mounting device includes at least two loops, and wherein at least one of the loops is laterally adjustable relative to at least one other loop.

32. The location device of claim 16, further comprising an external auxiliary power supply device connected via the charging port with a plug, and the external auxiliary power supply device having one or more mounting devices for facilitating attachment to the location device or another object.

33. The location device of claim 32, the auxiliary power supply comprising a battery within a sealed encasement.

34. The location device of claim 32, the mounting device of the external auxiliary power supply device being a clip.

35. The location device of claim 14 the battery having a primary cell and one or more extended cells, the cells being connected together and to one or more battery terminals, the cells being enveloped in a second encasement configured to coupled with the battery mount of the encasement, and the battery terminals extending through the second encasement and configured to electrically connect with the metal tabs of the encasement.

36. A location device, comprising
an encasement, the encasement being defined by an encasement wall,
a power port extending through the encasement wall for providing external power from a vehicle power source,
a power conversion circuit positioned inside the encasement and connected to the power port for converting the external power for use by the location device, and
one or more antenna ports extending through the encasement wall for connecting with one or more antennas, and
one or more circuit boards, with at least one of the one or more circuit boards being a cellular telecommunications board, located within the encasement and connected to the power conversion circuit,
wherein external power may be provided to the power port for powering the location device, the cellular telecommunications board is connected with the one or more antenna ports, and the cellular telecommunications board is configured to communicate with a cellular network, thereby enabling the location device to be located via cellular network location technology, and communicate that location via cellular communication, and
wherein the encasement encloses the one or more circuit boards and prevents the dialing of telephone numbers with the location device.

37. The location device of claim 36, further including a mechanism for automatically turning the device on when power is applied to the device.

38. The location device of claim 36, the circuit boards including a power monitoring and management board located within the encasement and connected with the power conversion circuit and the cellular telecommunications board for powering the location device, and monitoring the performance of the one or more circuit boards.

39. The location device of claim 36, wherein place of a cellular telecommunications board, a Bluetooth chip is provided in the device for relaying information to any available cellular phone.

40. The location device of claim 36, further including a memory and wherein the one or more circuit boards, in conjunction with the memory, records and transmits real time status data from the vehicle diagnostics port.

41. The location device of claim 36, further including:
a power button extending through the encasement wall and connected to the power monitoring and management board for powering the location device.

42. The location device of claim 36, further comprising a series of environmental sensors capable of recording environment status information, and relaying that information via the cellular network.

43. The location device of claim 36, further including,
a status LED extending through the encasement wall for reporting on the operation of the location device.

44. The location device of claim 36, further including at least one optional component, wherein the at least one optional component is a GPS chip, a bluetooth chip, a wifi chip, extra memory, or a combination thereof.

45. The location device of claim 36, the encasement comprising an exterior casing which is water and shock resistant.

46. A method of creating a location device utilizing components from new or pre-used cellular phones comprising
providing one or more cellular phones,
disassembling the one or more cellular phones to obtain cellular phone components needed to transmit a signal capable of being received by cellular network technology, wherein said cellular phone components include at least one cellular antenna and at least one cellular telecommunications board, said cellular antenna being connected to said cellular telecommunications board,
providing an encasement defined by an encasement wall, positioning the cellular phone components inside the encasement, and sealing the encasement;

wherein the cellular telecommunications board is configured to communicate with a cellular network, thereby enabling the location device to be located via cellular network location technology, and communicate that location via cellular communication;

wherein the encasement encloses the one or more circuit boards and prevents the dialing of telephone numbers with the location device.

47. The method of claim 46, utilizing cellular components capable of determining the location of the locating device through cellular phone based location technology.

48. The method of claim 46, utilizing cellular components capable of determining the location of the locating device through cellular network based location technology.

49. The method of claim 46, further including providing a power member within the encasement connected to the cellular phone components for providing power to the cellular phone components.

50. The method of claim 46, further providing a port connected to the power member and extending through the encasement wall for feeding power to the power member for powering the location device.

51. The method of claim 46, further including the wiring an antenna or antenna connector to cellular phone component or to an antenna port of the cellular phone component.

52. The method of claim 46, the power member being a battery positioned within the encasement.

53. The method of claim 46, the power member being a power conversion circuit positioned within the encasement.

54. The method of claim 46, further including the step of providing a power cord connectable to the port for transmitting an external electric charge to the battery to charge the battery.

55. The method of claim 48, further including the step of providing a power cord connectable to the port for transmitting external power to the power conversion circuit for use in powering the location device.

56. The method of claim 47, further including the steps of installing a GPS chip in the encasement with the cellular phone components, connecting the GPS chip to the power member, and connecting the GPS chip to a data port of the cellular phone component using a data cable, Bluetooth, or another communication means.

57. The method of claim 46, where the necessary cellular telephone components are acquired directly without having been first assembled into a cellular telephone.

58. The location device of claim 1, wherein said location information is communicated utilizing cellular data transfer to transfer said location information to a server.

* * * * *